(12) United States Patent
Michaelsen et al.

(10) Patent No.: US 10,330,205 B2
(45) Date of Patent: Jun. 25, 2019

(54) VALVE ASSEMBLY WITH ELECTRONIC CONTROL

(71) Applicant: Aerojet Rocketdyne, Inc., Sacramento, CA (US)

(72) Inventors: Mark Michaelsen, Gainesville, VA (US); Aaron Shook, Sacramento, CA (US)

(73) Assignee: Aerojet Rocketdyne, Inc., Rancho Cordova, CA (US)

( * ) Notice: Subject to any disclaimer, the term of this patent is extended or adjusted under 35 U.S.C. 154(b) by 0 days.

(21) Appl. No.: 15/526,791

(22) PCT Filed: Nov. 17, 2015

(86) PCT No.: PCT/US2015/061037
§ 371 (c)(1),
(2) Date: Sep. 8, 2017

(87) PCT Pub. No.: WO2016/085705
PCT Pub. Date: Jun. 2, 2016

(65) Prior Publication Data
US 2018/0045319 A1    Feb. 15, 2018

Related U.S. Application Data

(60) Provisional application No. 62/085,542, filed on Nov. 29, 2014.

(51) Int. Cl.
*F16K 31/124* (2006.01)
*F16K 1/54* (2006.01)
(Continued)

(52) U.S. Cl.
CPC ............... *F16K 1/54* (2013.01); *F02K 9/58* (2013.01); *F16K 1/38* (2013.01); *F16K 31/004* (2013.01);
(Continued)

(58) Field of Classification Search
CPC . F16K 1/54; F16K 1/38; F16K 31/004; F16K 31/408; F16K 37/0041; F16K 37/005; F16K 39/022; F02K 9/58
(Continued)

(56) References Cited

U.S. PATENT DOCUMENTS 4,647,008 A * 3/1987 Shirai ................. F16K 31/0655
                                              251/129.07
4,852,853 A * 8/1989 Toshio ................ F16K 31/0693
                                              251/129.07
(Continued)

FOREIGN PATENT DOCUMENTS

DE        102005014866      10/2006

OTHER PUBLICATIONS

The International Preliminary Report on Patentability for PCT Application No. PCT/US2015/061037, dated Jun. 8, 2017.
(Continued)

*Primary Examiner* — Minh Q Le
(74) *Attorney, Agent, or Firm* — Joel G. Landau

(57) ABSTRACT

A valve assembly includes a housing (22) that has a fluid input (24) and a fluid output (26). A pintle (30) is disposed in the housing, and an actuator (36) is operatively coupled to move the pintle. The pintle includes a passage (32) that fluidly couples the fluid output with a pressure balance volume (34) located between the pintle and the housing adjacent the linear actuator. A controller (38) is electrically connected with the actuator, and there is a variable flow area (40) from the fluid input to the fluid output that is defined between the pintle and the housing.

16 Claims, 3 Drawing Sheets

(51) Int. Cl.
  *F02K 9/58* (2006.01)
  *F16K 37/00* (2006.01)
  *F16K 39/02* (2006.01)
  *F16K 1/38* (2006.01)
  *F16K 31/00* (2006.01)
  *F16K 31/40* (2006.01)

(52) U.S. Cl.
  CPC .......... *F16K 31/408* (2013.01); *F16K 37/005* (2013.01); *F16K 37/0041* (2013.01); *F16K 39/022* (2013.01)

(58) Field of Classification Search
  USPC .......... 137/486, 528, 487.5, 290; 251/129.07
  See application file for complete search history.

(56) References Cited

U.S. PATENT DOCUMENTS

| | | | | |
|---|---|---|---|---|
| 5,048,790 | A * | 9/1991 | Wells | F16K 31/408 251/30.04 |
| 5,556,075 | A * | 9/1996 | Weber | F16K 1/34 251/282 |
| 6,568,656 | B1 * | 5/2003 | Wrocklage | F16K 1/38 251/121 |
| 6,802,488 | B1 * | 10/2004 | Patterson | F16K 1/123 251/129.11 |
| 8,662,312 | B2 * | 3/2014 | Ito | B07C 5/3422 209/552 |
| 8,746,658 | B2 * | 6/2014 | Gauss | F16K 31/047 251/129.12 |
| 9,890,869 | B2 * | 2/2018 | Lv | F16K 31/02 |
| 2004/0099832 | A1 * | 5/2004 | Gessaman | F16K 17/0413 251/282 |
| 2007/0295925 | A1 * | 12/2007 | Spiegl | F16K 11/044 251/129.07 |
| 2010/0170583 | A1 | 7/2010 | Gessaman | |
| 2012/0186655 | A1 * | 7/2012 | Smirnov | G05D 7/0635 137/1 |
| 2014/0225016 | A1 * | 8/2014 | Schwelm | F16K 31/0693 251/129.07 |
| 2014/0299204 | A1 * | 10/2014 | Somani | G01F 15/003 137/486 |
| 2015/0090912 | A1 * | 4/2015 | Buse | F16K 1/36 251/129.07 |
| 2017/0130868 | A1 * | 5/2017 | Jackson | F16K 1/12 |
| 2017/0350513 | A1 * | 12/2017 | Shen | F16K 1/38 |

OTHER PUBLICATIONS

International Search Report for International Application No. PCT/US2015/061037 completed Feb. 12, 2016.

* cited by examiner

VALVE ASSEMBLY WITH ELECTRONIC CONTROL

CROSS-REFERENCE TO RELATED APPLICATIONS

The present disclosure claims priority to U.S. Provisional Patent Application No. 62/085,542, filed Nov. 29, 2014.

STATEMENT REGARDING FEDERALLY SPONSORED RESEARCH OR DEVELOPMENT

This invention was made with government support under contract number HQ0147-11-C-0017 awarded by the United States Missile Defense Agency. The government has certain rights in the invention.

BACKGROUND

Regulator valves may be used in aerospace vehicles, ground vehicles, or other systems for controlling fluid flow between components. For example, space vehicles utilize pressurized fluids for propulsion. Regulator valves may be used as a pressure turn down in order to deliver the pressurized fluid at a lower pressure than at the source.

SUMMARY

A valve assembly according to an example of the present disclosure includes a housing that has a fluid input and a fluid output, a pintle disposed in the housing, and an actuator operatively coupled to move the pintle. The pintle includes a passage that fluidly couples the fluid output with a pressure balance volume located between the pintle and the housing adjacent the linear actuator. A controller is electrically connected with the actuator. There is a variable flow area from the fluid input to the fluid output defined between the pintle and the housing.

In a further embodiment of any of the foregoing embodiments, the actuator is a piezo-electric actuator.

In a further embodiment of any of the foregoing embodiments, the pintle includes a shank portion, an enlarged head portion at a first axial end of the shank portion, and an enlarged base portion at a second, opposed axial end of the shank portion.

In a further embodiment of any of the foregoing embodiments, the pintle includes a retrograde surface.

In a further embodiment of any of the foregoing embodiments, the passage is a linear central passage.

In a further embodiment of any of the foregoing embodiments, relative to a direction of movement of the pintle, the fluid input is a radial input and the fluid output is an axial output.

In a further embodiment of any of the foregoing embodiments, the controller is configured to move the pintle via the linear actuator responsive to at least an instant input pressure at the fluid input.

In a further embodiment of any of the foregoing embodiments, the controller is configured to move the pintle via the actuator responsive to at least an instant output pressure at the fluid output.

In a further embodiment of any of the foregoing embodiments, the controller is configured to move the pintle via the actuator responsive to a pressure ratio between an instant input pressure at the fluid input and an instant output pressure at the fluid output.

In a further embodiment of any of the foregoing embodiments, the controller is configured to dynamically move the pintle via the actuator responsive to changes in a pressure ratio between an instant input pressure at the fluid input and an instant output pressure at the fluid output.

In a further embodiment of any of the foregoing embodiments, the variable flow area is linearly variable with respect to a linear position of the pintle.

A further embodiment of any of the foregoing embodiments includes controlling a linear position of the pintle based on electronic feedback signals to the controller. The electronic feedback signals represent at least one of instant pressure or instant pintle position.

In a further embodiment of any of the foregoing embodiments, the instant pressure is an instant input pressure at the fluid input.

In a further embodiment of any of the foregoing embodiments, the instant pressure is an instant output pressure at the fluid output.

In a further embodiment of any of the foregoing embodiments, the instant pressure is a pressure ratio between an instant input pressure at the fluid input and an instant output pressure at the fluid output.

In a further embodiment of any of the foregoing embodiments, the controlling includes dynamically changing the linear position of the pintle as the instant pressure changes.

A valve assembly according to an example of the present disclosure includes a housing that has a fluid input and a fluid output, a pintle disposed in the housing, an actuator, a controller electrically connected with the actuator, and a variable flow area from the fluid input to the fluid output defined between the pintle and the housing. The actuator is operable to vary a position of the pintle relative to the housing and thereby change the variable flow area.

In a further embodiment of any of the foregoing embodiments, the actuator is coupled with the housing and operable to move the housing with respect to the pintle.

In a further embodiment of any of the foregoing embodiments, the pintle includes a retrograde surface defining the variable flow area.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
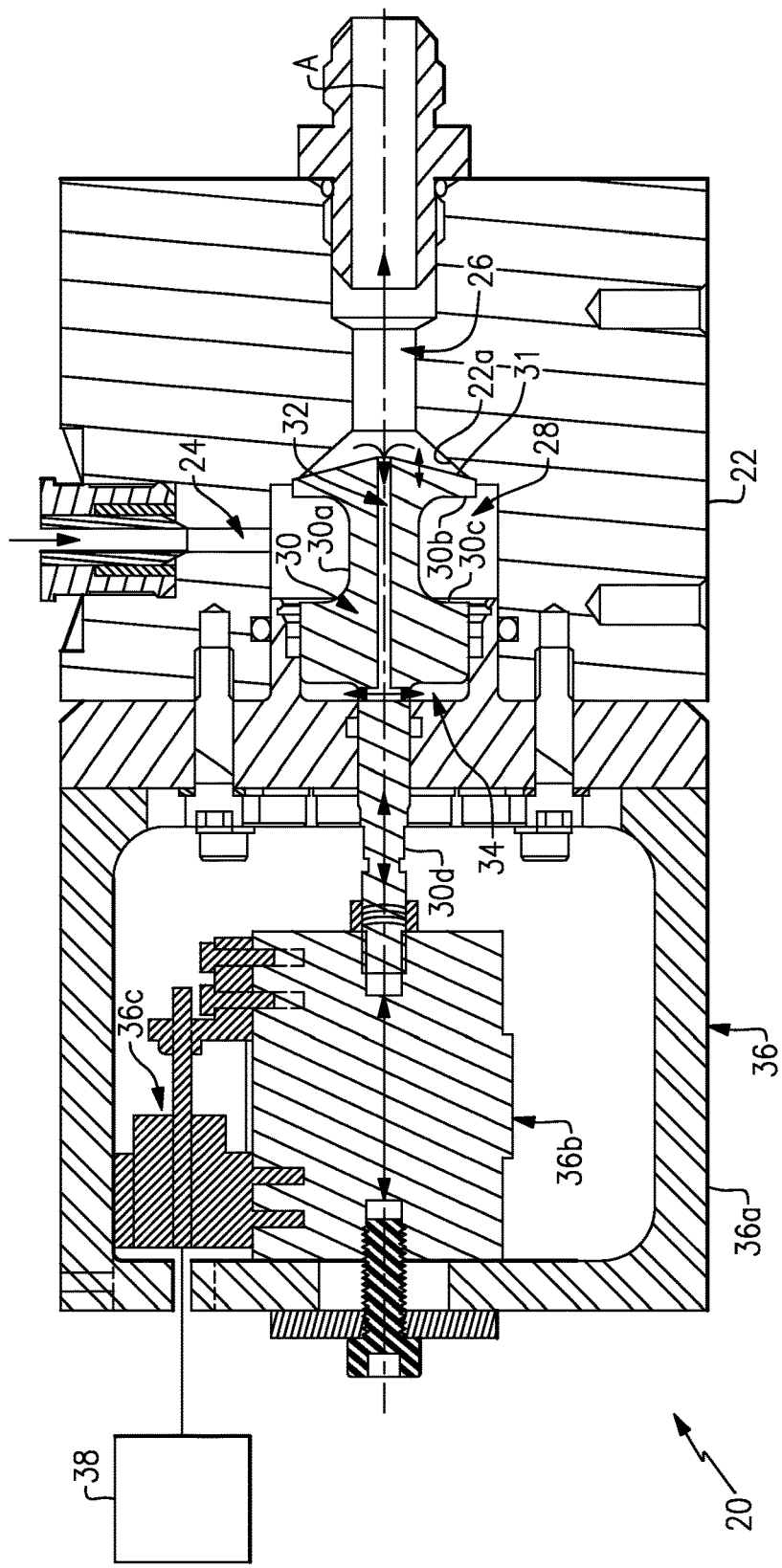
FIG. 1 illustrates an example valve assembly.

FIG. 1 illustrates a cross-section of an example valve assembly 20 that is electronically controlled and can be used to precisely control flow output. The valve assembly 20 includes a housing 22 with a fluid input 24 and a fluid output 26. The fluid input 24 and the fluid output 26 are passages that lead into and out of, respectively, an interior cavity 28 in the housing 22. In this example, the fluid input is a radial passage and the fluid output is an axial passage.

A pintle 30 is located in the interior cavity 28. The pintle 30 is moveable along central axis A between a fully closed position in which the pintle 30 abuts a valve seat 22a in the interior cavity 28 of the housing 22 and a plurality of open positions in which the pintle 30 is spaced-apart from the valve seat 22a. In this example, the pintle 30 includes a shank portion 30a, an enlarged head portion 30b, an enlarged base portion 30c, and a stem 30d that extends axially from the base portion 30c. The term "enlarged" refers to the portions 30b and 30c being larger in diameter than the shank portion 30a. The enlarged head portion 30b and enlarged base portion 30c are situated at opposed axial ends of the shank portion 30a. The enlarged head portion 30b includes a valve trim 31. The valve trim 31 is a retrograde surface or retrograde portion 30b that slopes in an aft direction with respect to the forward flow direction out from the fluid output 26. In the fully closed position the valve trim 31 abuts that valve seat 22a.

The pintle 30 also includes a passage 32 that fluidly couples the fluid output 26 with a pressure balance volume 34 located behind the base 30c of the pintle 30. For example, the passage 32 in this example is linear and may include one or more radial orifices near the base portion 30c that lead into the volume 34. The passage 32 serves to balance pressures across the pintle 30 and thus reduce the amount of force that is necessary to move the pintle 30. For instance, pressure from the fluid output 26 is transferred through the passage 32 such that volume 34 is pressurized. The pressurized volume 34 tends to balance the forces on the pintle 30 when fluid flows through the valve assembly 20.

An actuator 36 is operable to vary a position of the pintle 30 relative to the housing 22. In this example, the actuator 36 is operatively coupled with the stem 30d to enable movement of the pintle 30, while the housing 22 remains stationary. For instance, the actuator is a linear actuator that is operable to move the pintle 30 axially back and forth along the axis A. The actuator 36 includes a housing 36a that is secured or fastened to the housing 22. An actuator element 36b is mounted in the housing 36a and serves to move the pintle 30. In one example, the actuator 36 is a piezo-electric actuator that is electrically responsive to move the pintle 30. The actuator 36 can further include a linear variable displacement transducer 36c that is operable to detect linear position of the pintle 30.

A controller 38 is electrically connected with the actuator element 36b and linear variable displacement transducer 36c of the actuator 36. For example, the controller 38 can include hardware (e.g., a microprocessor, computer, etc.), software, or both, that is configured and/or programmed to perform the control functions described herein.

Figure 2:
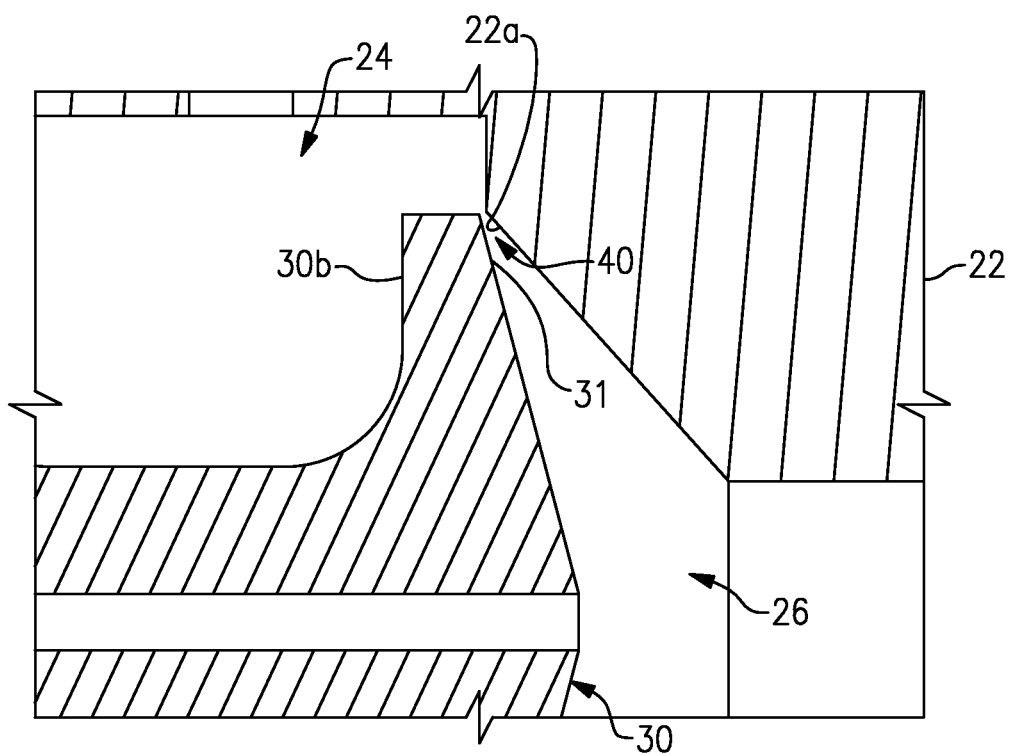
FIG. 2 illustrates an example open position of a pintle in a valve assembly.

In FIG. 1 the pintle 30 is shown in its fully closed position in which the valve trim 31 of the enlarged head portion 30b seals with the valve seat 22a of the housing 22. FIG. 2 shows the pintle 30 in a representative open position in which the pintle has been retracted such that there is a flow area 40 from the fluid input 24 to the fluid output 26. The flow area 40 is defined between the valve trim 31 of the pintle 30 and the valve seat 22a of the housing 22. The actuator 36 is operable to vary a position of the pintle 30 relative to the housing 22 and thereby change the size of the variable flow area 40 in a controlled manner. For example, the geometry of the valve trim 31 of the pintle 30 and the geometry of the valve seat 22a of the housing are such that the flow area 40 changes linearly with respect to the linear position of the pintle 30.

The controller 38 can utilize one or more electronic feedback signals to precisely control position of the pintle 30. Precise control of the position enables finer control over flow from the fluid output. For example, the electronic feedback signals can include signals representing an instant pressure, instant pintle position, or combinations of these. The instant pressure can be an instant input pressure at the fluid input 24, an instant output pressure at the fluid output 26, and/or a pressure ratio between the instant input pressure and the instant output pressure. For instance, the pressures can be obtained from pressure taps in or near the fluid input 24 and the fluid output 26.

In further examples, the controller 38 may utilize both the instant input pressure and the instant output pressure along with the instant pintle position. For example, the controller 38 may re-position the pintle 30 to a pre-selected open position by adjusting the amount of power provided to the piezo-electric actuator. The controller 38 may be pre-programmed with look-up tables or other data relating pre-selected positions to power levels. Thus, when there is a demand for more or less flow than at the instant position of the pintle 30, the controller 38 can re-position the pintle 30 to a different pre-selected position to adjust the flow, or through series of positions until the flow is adjusted to the desired level.

In further examples, the controller 38 can change the pintle position 30 to adjust between different pressure ratios between the instant input pressure and the instant output pressure. The illustrated configuration of the valve assembly 20 may allow for controlled pressure turn down ratios of up to approximately 20:1 between the instant input pressure and the instant output pressure. Moreover, the controller 38 may change the pintle position dynamically with source pressure variations. For example, if the source pressure changes such that the instant input pressure changes, the controller 38 detects that the pressure ratio has changed and thus adjusts the pintle position to re-establish a set-point output pressure.

Thus, the configuration of the valve assembly 20, geometry of the flow area 40, and the electronic feedback signals permit the controller 38 to adjust the pintle position to finely control output pressure. The ability to precisely control the output flow may enable more efficient use of the fluid. If the fluid is a propellant or fuel in a spacecraft, more efficient use may in turn enable the spacecraft to carry less propellant or fuel, saving weight. If used for a thrust system, this enables variable thrust levels by changing the output pressure during valve operation.

Figure 3:
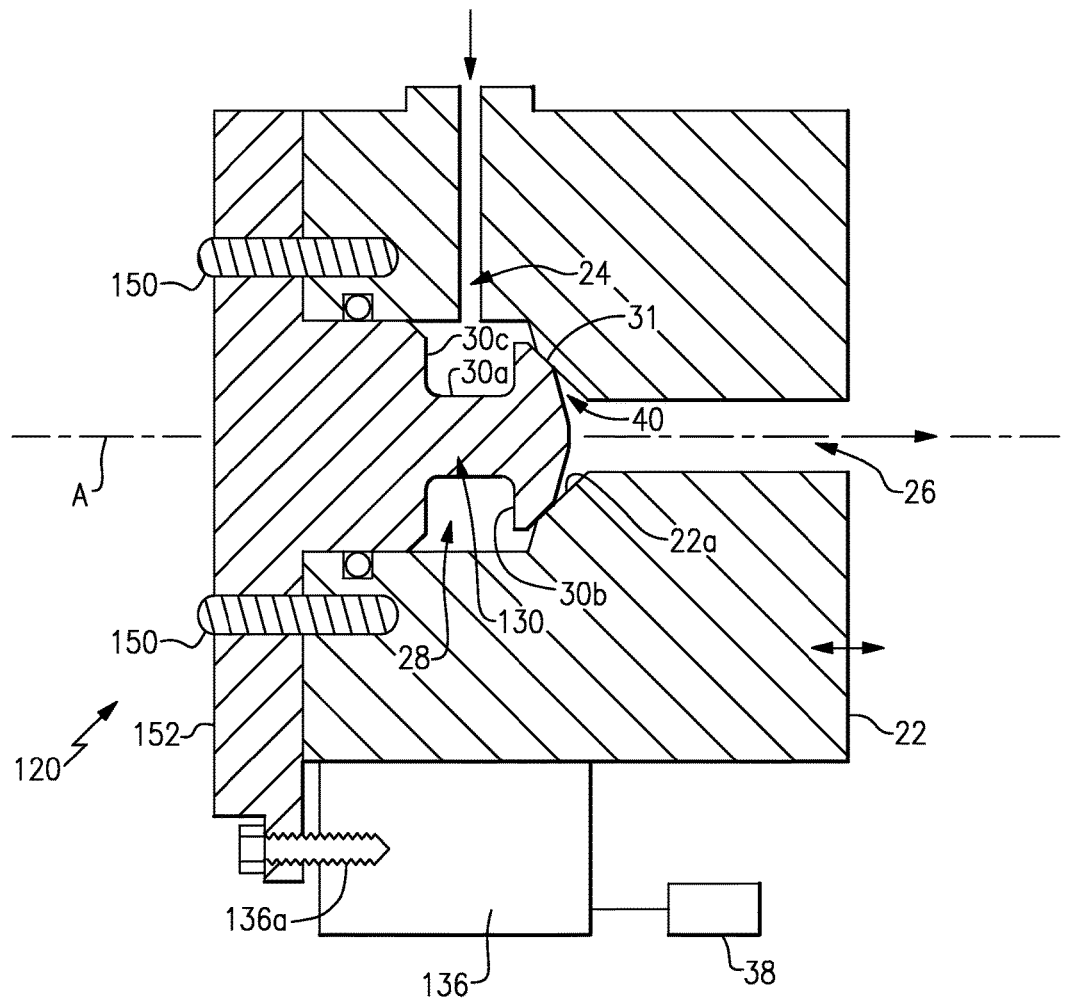
FIG. 3 illustrates another example valve assembly.

FIG. 3 illustrates another example valve assembly 120. In this disclosure, like reference numerals designate like elements where appropriate and reference numerals with the addition of one-hundred or multiples thereof designate modified elements that are understood to incorporate the same features and benefits of the corresponding elements. In this example, the actuator 136 is operable to vary a position of the pintle 130 relative to the housing 22 and thereby change the variable flow area 40. However, rather than being coupled to move the pintle, the actuator 136 is coupled to move the housing 22, and the pintle 130 remains stationary. In this regard, the housing 22 is moveably mounted on one or more guide pins 150. The guide pin or pins 150 extend axially from a closure portion 152. The pintle 130 and closure portion 152 are integrally formed as one piece.

In this example, the actuator 136 is fixed on the housing 22 and a static actuator member 136a is fixed on the closure portion 152. The static actuator member 136a is threaded and the actuator 136 is a rotary actuator that engages the threads to axially move the housing 22. The actuator 136 is electrically connected with the controller 38 and can be controlled using the control strategies described in the prior examples.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A valve assembly comprising:
a housing having a fluid input and a fluid output;
a pintle disposed in the housing;
an actuator operatively coupled to move the pintle, the pintle including a passage fluidly coupling the fluid output with a pressure balance volume located between the pintle and the housing adjacent the actuator;
a controller electrically connected with the actuator; and
a variable flow area from the fluid input to the fluid output defined between the pintle and the housing,
wherein the controller is configured to move the pintle via the actuator responsive to a pressure ratio between an instant input pressure at the fluid input and an instant output pressure at the fluid output.

2. The valve assembly as recited in claim 1, wherein the actuator is a piezo-electric actuator.

3. The valve assembly as recited in claim 1, wherein the pintle includes a shank portion, an enlarged head portion at a first axial end of the shank portion, and an enlarged base portion at a second, opposed axial end of the shank portion.

4. The valve assembly as recited in claim 1, wherein the pintle includes a retrograde surface.

5. The valve assembly as recited in claim 1, wherein the passage is a linear central passage.

6. The valve assembly as recited in claim 1, wherein, relative to a direction of movement of the pintle, the fluid input is a radial input and the fluid output is an axial output.

7. The valve assembly as recited in claim 1, wherein the controller is configured to move the pintle via the linear actuator responsive to at least an instant input pressure at the fluid input.

8. The valve assembly as recited in claim 1, wherein the controller is configured to move the pintle via the actuator responsive to at least an instant output pressure at the fluid output.

9. The valve assembly as recited in claim 1, wherein the controller is configured to dynamically move the pintle via the actuator responsive to changes in a pressure ratio between an instant input pressure at the fluid input and an instant output pressure at the fluid output.

10. The valve assembly as recited in claim 1, wherein the variable flow area is linearly variable with respect to a linear position of the pintle.

11. A method of controlling the valve assembly of claim 1, the method comprising:
controlling a linear position of the pintle based on electronic feedback signals to the controller, the electronic feedback signals representing at least one of instant pressure or instant pintle position.

12. The method as recited in claim 10, wherein the instant pressure is an instant input pressure at the fluid input.

13. The method as recited in claim 10, wherein the instant pressure is an instant output pressure at the fluid output.

14. The method as recited in claim 10, wherein the instant pressure is a pressure ratio between an instant input pressure at the fluid input and an instant output pressure at the fluid output.

15. The method as recited in claim 10, wherein the controlling includes dynamically changing the linear position of the pintle as the instant pressure changes.

16. The valve assembly as recited in claim 1, wherein the pintle includes a retrograde surface defining the variable flow area.

* * * * *